United States Patent [19]

Bloemendaal et al.

[11] 4,183,662
[45] Jan. 15, 1980

[54] GRAVITY IMPELLED TRANSPORT FOR ALIGNING AN ORIGINAL IN A COPIER

[75] Inventors: John F. Bloemendaal, Rochester; Arthur M. Boone, Pittsford, both of N.Y.

[73] Assignee: Eastman Kodak Company, Rochester, N.Y.

[21] Appl. No.: 892,611

[22] Filed: Apr. 3, 1978

[51] Int. Cl.$^2$ .................. G03B 27/62; G03B 27/64
[52] U.S. Cl. .................................. 355/76; 271/3; 271/226
[58] Field of Search ............. 355/50, 51, 75, 76; 271/226, 229, 235, 3

[56] References Cited

U.S. PATENT DOCUMENTS

| | | | |
|---|---|---|---|
| 3,117,663 | 1/1964 | Payne | 193/40 |
| 3,829,214 | 8/1974 | Zahn et al. | 355/83 |
| 4,113,380 | 9/1978 | Walter | 355/75 |

Primary Examiner—Richard A. Wintercorn
Attorney, Agent, or Firm—David M. Woods

[57] ABSTRACT

A gravity impelled transport for moving an original to an exposure station in a photographic printer or copier and there aligning the original in a reference position for exposure. The transport includes an inclined chute defining first and second planar guides for supporting and directing the original along a face and an edge thereof. The chute has a compound slope with respect to the horizontal such that gravitational forces will urge the original into guided association with the separate guide beds while moving the original along the chute. A retractable pin at the exposure station intercepts and stops the moving original thereby permitting the gravitational forces to align the original in the reference position.

9 Claims, 6 Drawing Figures

GRAVITY IMPELLED TRANSPORT FOR ALIGNING AN ORIGINAL IN A COPIER

BACKGROUND OF THE INVENTION

1. Field of the Invention

This invention relates in general to photographic printers and copiers intended for exposing light-sensitive material to an original and making a photographic likeness thereof. More particularly, the invention provides a transport apparatus for supporting and guiding an element, bearing an original image, that moves by its own weight through operative stations in a printer or copier and, yet more particularly, includes apparatus for aligning the element in a printing station.

2. Description of the Prior Art

Inasmuch as the invention has particular utility in the field of photographic printers, the description relative to the prior art will be couched in such terms. However the need to cast the invention in terms of particular apparatus does not diminish its importance in the area of sheet transport generally. In fact the description here provided for use in photographic printing also illustrates the advantages of gravity guided transport generally.

The problem of transporting and then orienting original material in a photographic printer has typically resolved into two companion situations. On the one hand, original material—such as photographic negatives—has been joined together in lengthy strips which are advanced through the printer for individual exposure with varying degrees of operator assistance. On the other extreme, when faced with odd-sized material or originals not capable of convenient joining, the printer operator manually positions each piece of original material before making an exposure. The latter situation is less desirable for its related impact on productivity and labor costs.

With the introduction of copy materials adapted for direct exposure to the customer print itself—rather than to the photographic negative—photo processors and printers need to provide for volumes of single prints delivered to them for duplication. In some cases single customer prints are the only practical originals, e.g., prints developed from instant processing film packages since the negative is not readily recoverable for purposes of duplication. Furthermore, joining single pieces of original material into lengthy strips for automated printing may be time consuming and expensive and additionally involves the risk of damaging the original print. Unlike negatives, original prints are not only returned to their owner but are subject to the more critical scrutiny deserving a finished product since the originals themselves are images suitable for viewing, mounting, framing, etc. Therefore the need exists for a simple transport apparatus disposed to efficiently handle large volumes of single originals carefully and inexpensively, while also accurately and repeatedly positioning each original in a printing gate for exposure to light sensitive photographic material.

Registration of an original in the printing gate of a photographic printer should be precisely controlled if the duplicate image is to be squarely positioned and framed relative to the edges of the light-sensitive copy paper. Since the copy paper is typically provided in roll form and automatically unwound and positioned frame-by-frame in a predetermined location in the optical axis of the printing mechanism, the full realization of image alignment rests with the original element and the manner in which it is positioned at the printing gate.

Registration of individual pieces of original sheet material is conventionally performed by manual assistance or by involved transport apparatus. Manual registration, as the permanent recourse, is unsuitable for reasons of productivity and labor expense. Automatic transport apparatus typically involves conveying systems that operate in two dimensions—one to shove the material into the gate until stopped and another to force the material transversely into an aligning position. Besides the complexity, such apparatus becomes massive when space is at a premium in the machine. Other devices based on hydraulic or fluidic positioning possess similar drawbacks.

SUMMARY OF THE INVENTION

The present invention eliminates involved apparatus while relegating human intervention to the mere step of dropping the original sheet material into a channelled chute with no thought toward registration. The transport apparatus assures that the original is aligned in the printing section of the printer by the cooperative effect of a pair of polished guide surfaces and gravitational force acting therewith on the moving original.

The invention provides means for supporting and guiding a sheet-like original bearing image indicia thereon through at least one operative station—such as a printing gate—in a copier. The copier includes mechanism for exposing light-sensitive material to the original and providing a likeness thereof—whether positive or negative. Means are provided for supporting and guiding the original along one each of its faces and edges while traversing through the copier to the operative station. On the support means are guide surfaces underlying the face and abutting the edge. The guide surfaces are inclined with respect to a horizontal dimension of the copier such that gravitational force is utilized to direct the face and edge of the original into contact with the respective guiding surfaces. At the same time the resultant force provided by the combination of gravitational force and frictional resistance of the guides induces the original to slide along the support means. Further means cooperative with the support means expose the light-sensitive material to the original at a predetermined position in its gravitationally induced traverse of the support means. Registration means are disposed adjacent the predetermined exposure position at the operative station to abut the element and interrupt its further movement. The predetermined position is so disposed that gravitational force bears upon the face and edge of the original and induces the original into an aligned and repeatable association with the guiding surfaces adjacent the predetermined position.

The invention further provides a printer transport apparatus for gravitational guiding of an original through an inclined path from a loading station to an operative station in a photographic printer. There the original is aligned by gravitational force in a predetermined reference position. Means are provided having first and second elongate surfaces for engaging a face and an edge of the original. Importantly, the engaging means are supported adjacent first and second intersecting planes each located by an acute angle with respect to a horizontal plane in the printer. This o.·entation generates gravitationally induced guiding forces that urge the face and edge of the original into engagement with the elongate surfaces and induce the original to slide under its own weight to the operative station. Further, proximate the operative station there are means for intercepting and stopping the moving original along another of its edges thereby permitting the gravitationally induced guiding forces to align the original in the reference position.

What has therefore happened is that the original print, although even carelessly dropped onto the support means, has been accurately registered in a repeatable position due to the specially positioned guides and gravitational force acting therewith. The vagaries of operator alignment are minimized and the time-wise transport of the originals through the machine approaches the limitations imposed by ancillary mechanical systems in the printer.

In an additional feature of the invention, the sliding movement of the original may be interrupted a predetermined distance from the registration means such that a predetermined gravitationally induced sliding distance is established between the point of interruption and the registration means. By at least momentarily overriding gravity a predetermined acceleration can be imparted to the released original before striking the registration means. This feature isolates the gravitationally induced transport of the original from transient velocity and motion caused by unpredictable variations in the way in which the operator places the original into the transport apparatus.

The invention will be described with reference to the figures, in which:

FIG. 1 is a perspective view showing a presently preferred embodiment of the gravity transport;

FIGS. 2 and 3 are two elevations of the transport taken along lines 2—2 and 3—3 respectively of FIG. 1 and showing the angular position of the transport relative to the horizontal;

FIGS. 4A and 4B represent one presently preferred flow diagram of logic control for use with the gravity transport; and FIG. 5 is a partly perspective and partly block diagram illustrating printer components operable with and in response to the gravity transport.

DESCRIPTION OF THE PREFERRED EMBODIMENT

Because printers and copiers are well known, particularly in connection with photographic printing, the present description will be directed in particular to elements forming part of, or cooperating more directly with, the present invention. Printer or copier elements not specifically shown or described herein may be selected from those known in the art. Since the invention has particular utility with photographic printers, the description will be made in such terms. However the invention is generally useful wherever an original must be moved from place to place in a copy machine.

Figure 1:
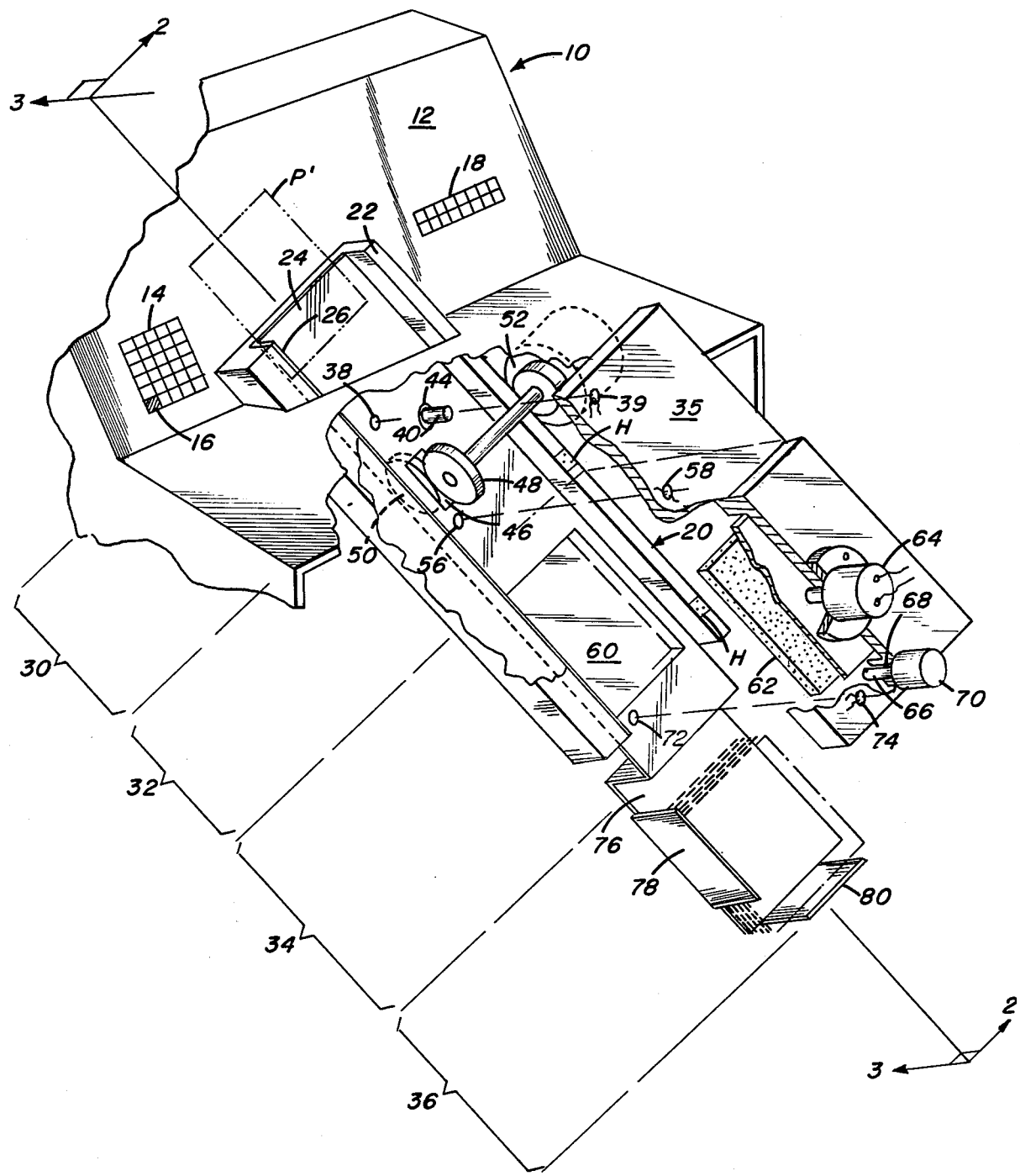

Referring initially to FIG. 1, a printer generally designated by the reference numeral 10 is shown in partially cut away form. An operator control panel 12 spans the face of the printer and includes a group of control buttons 14, inclucing a feed key 16, for energizing and directing the operation of the apparatus. An operator sits facing the control panel 12 and within easy reach of the control buttons 14 and the print transport about to be described. A display panel 18 is mounted on the control panel 12 for displaying order information keyed into the printer by the operator.

The cutaway portion of the printer 10 is such as to expose the full length of a print transport device, generally referred to hereinafter as a gravity print transport and described by the reference numeral 20. A channel-shaped track 22 forms the body of the gravity print transport 20. Particular attention is paid to two surfaces of the track 22: one surface 24 functions as a planar guide bed for a print P', shown in broken lines and transported thereover. Another surface 26 serves as a planar edge guide for the print P' while the guide bed surface 24 is supporting and guiding one face of the print. Although a print is specifically illustrated, the material supported and guided by the surfaces 24 and 26 may be more generally considered an original bearing indicia of the desired image.

Each of the surfaces 24 and 26 is highly polished; for that reason it is preferable to coat the track 22 along surfaces 24 and 26 with stainless steel, chrome plated brass, or similar material that is receptive to a highly polished surface. It is emphasized that the choice of a channel-shaped track 22 is one of convenience; any structure that would support the guide bed surfaces 24 and 26 would be equally sufficient, at least for the purpose of guidance. The guide surfaces 24 and 26 preferably define planes that orthogonally intersect each other although deviations from orthogonality may be tolerated. Similarly the planes may fail to intersect as long as the thickness of the original is greater than the free space created between the edge and face guides at their point of closest contact, i.e., the point nearest to intersection.

For ease of discussion, the gravity print transport is functionally divided into four sections: a feed or loading section 30, a metering section 32, an exposure section 34 and a collection section 36. Each section is bracketed accordingly in FIG. 1. A cover 35 is hinged to the track 22 and overlies portions of the feed section 30, the metering section 32 and the exposure section 34. The cover 35 is shown spaced from the transport 20 in FIG. 1 for clarity of illustration; in use the cover 35 is fastened to one side of the transport 20 by hinges H. The sides of the channel-shaped track 22 form rails for supporting the cover 35 when in its closed position so that sufficient space exists between the guide bed 24 and the cover 35 for the print P' to pass freely between.

Figure 2:
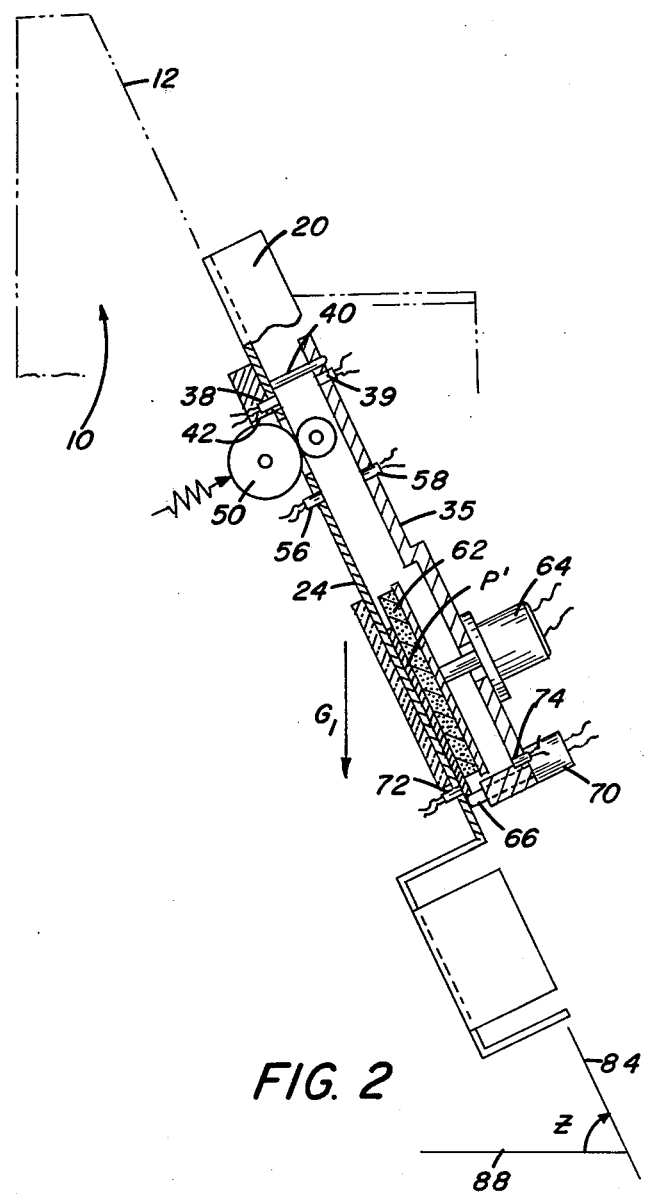

The feed section 30 projects from the interior portion of the printer 10 so that the operator may readily insert the print P' into the gravity print transport 20. A light emitter 38 is mounted at one end of the feed section 30 for engagement with the print P' when it is fully positioned in the feed section 30 against an entrance pin 40. An entrance detector 39 is mounted directly opposite the light emitter 38 on the cover 35. The pin 40 connects to an air cylinder 42 (as best seen in FIG. 2) and freely projects through an opening 44 in the guide bed surface 24.

In the metering section 32, there is another opening 46 for permitting a metering drive roller 48 to engage a pinch roller 50 with the nip therebetween being substantially in a plane of the guide bed 24. The drive roller 48 is mounted for rotation on a motor 52. A metering disk—which will be described later in connection with FIG. 5—is driven from the pressure roller 50 for determining the length of the print P'. A second light emitter 56 is located on the guide bed 24 just beyond the nip of the metering roller-pinch roller combination. Directly opposite the light beam of emitter 56, on the cover 35, is a leading edge detector 58.

Turning now to the exposure section 34 of the gravity print transport 20, a transparent glass platen 60 is inset into an opening in the guide bed 24 such that the surface of the platen 60 is substantially coplanar with the guide bed 24. Situated opposite the platen 60 on the cover 35 is a pressure plate or clamping pad 62 pneumatically operable by an air cylinder 64. An exit pin 66 freely protrudes through an opening 68 in the cover 35 for reciprocal movement by an air cylinder 70. A third light emitter 72 is located between the exit pin 66 and the glass platen 60. Opposite the emitter 72, on the cover 35, is a print gate detector 74 for indicating the presence of the print P' against the exit pin 66. Each of the detectors 39, 58 and 74 may be conventional photosensors. Finally the collection section 36 includes a collection tray 76 having sides 78 and 80 for supporting a stack of prints (shown in phantom lines) without interfering with the prior operation of the gravity print transport 20.

It was found that a print transport is simplified, but remains significantly effective, if gravity is permitted to influence the movement of the print. However, several constraints affect the use of gravitational force. The fall or slide of the print must be controllably guided and, importantly, the print must finally settle into a precise position not only disposed for correct exposure but capable of replication time and again. These requirements must be met without putting artificial constraints on the activity of the operator, i.e., without requiring that the print be shoved into the feed section 30 at a particular angle or velocity, etc. In addition, the transport must accommodate various sizes of prints with various degrees of paper curl. Although undesirable, paper curl is sometimes present in customer returned prints and must not cause the machine to jam or otherwise malfunction. The proper combination of gravitational force and guidance was empirically found to depend on tilting the print transport 20 in two substantially orthogonal directions, both sloped away from a horizontal direction with a substantial vertical bearing.

Figure 3:
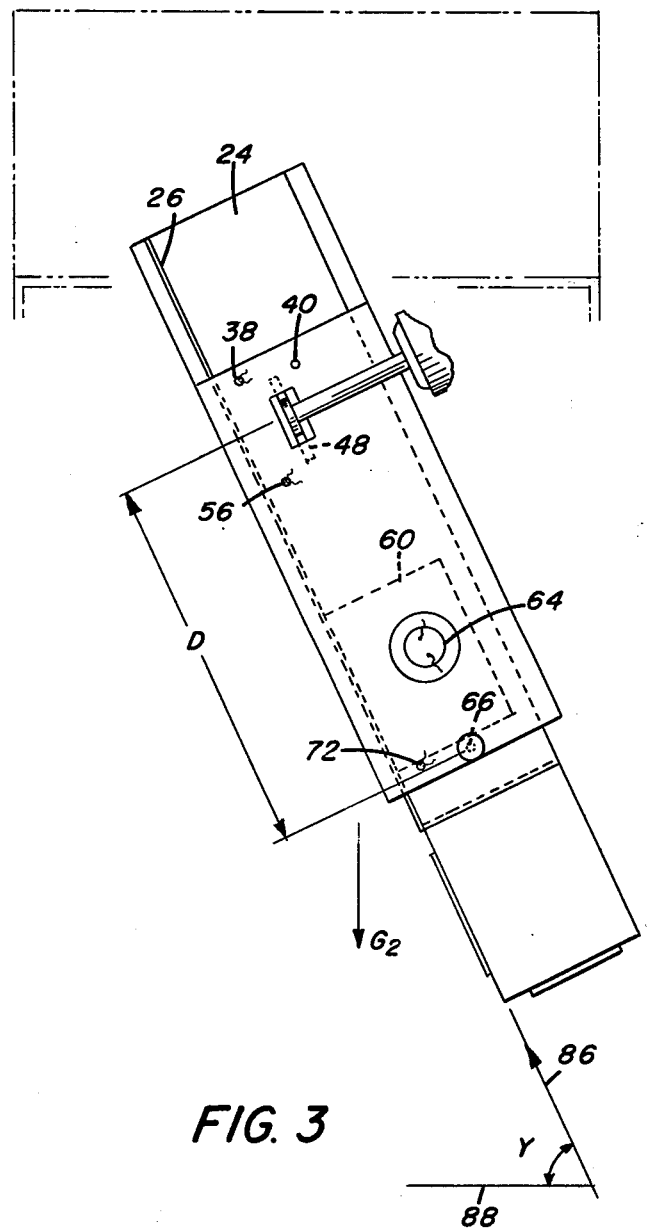

The requisite tilt is shown in the plan views of FIGS. 2 and 3. The printer 10 is shown situated with respect to a horizontal reference plane indicated by marker 88. Referring now to FIG. 2, the bed 24 is positioned adjacent a first inclined reference plane indicated by a directional marker 84 such that a slope angle Z is formed between the marker 84, and therefore the bed 24, and the horizontal marker 88. The slope angle Z has a substantial vertical bearing and contributes a component of gravitational force $G_1$ that causes the print P' to bear against the highly polished guide bed surface 24. But this single component is insufficient for repeatable guidance of the print to the exposure section 34 and against the exit pin 66. Referring next to FIG. 3, the inclined edge guide 26 is further positioned adjacent a second inclined reference plane indicated by another marker 86 such that a slope angle Y is formed between the marker 86, and therefore the edge guide 26, and the horizontal marker 88. The slope angle Y also has a substantial vertical bearing and contributes a second component of gravitational force $G_2$ that causes the print P' to bear against the highly polished edge guide surface 26. The combination of the gravitational forces $G_1$ and $G_2$ form a resulting force that induces the print to slide along both surfaces simultaneously until interrupted by the exit pin 66 where the print is registered in position for exposure.

The illustration thus far is one way of describing the tilt given to the gravity print transport 20. Alternatively, but consistent with the slope angle description, the transport 20 can be described as being so tilted in a compound angle that components of gravitational force cause the print to bear against both the planar guide bed 24 and the planar edge guide 26. Slope angles Y and Z are also angles defined within planes formed from the mutually horizontal marker 88 to the slope markers 84, 86, respectively, and, as thus defined, the angles form a locus of points in mutually orthogonal intersecting planes each located by an acute angle with respect to the horizontal. However described, the compound angular incline or slope of the gravity feed transport 20 can be resolved into two slope angles, Y and Z. Reliable operation has been experienced when the Y slope is between 75° and 55° and the Z slope is between 80° and 60°. However, these angular ranges are not intended as limitations since the concept of the invention is useful with any combination of angles as long as the components of gravitational force are sufficient to cause the print to simultaneously bear against both guide surfaces.

The provision of slope angles Y and Z assure gravitationally-guided transport of original material, such as the print, in the copier or printer. While gravitationally induced alignment of the original is provided by such design, additional control is obtained if the distance of gravitationally-induced sliding is predetermined. The entrance pin 40, already included upstream from the exposure section 34 for restraining the print subject to machine timing and throughput requirements, also causes the print P' to completely decelerate after being inserted into the feed section 30 by the operator. In the present embodiment, after the print P' is released from the pin 40 the combination of the metering roller 48 and and the pinch roller 50 again overrides the effect of gravity while the print is engaged in their nip. Either the pin 40 or the rollers 48 and 50 may be considered as defining a location on the gravity print transport at which the print P' is restrained from gravitationally induced movement.

In the presently preferred embodiment, the rollers 48 and 50 divide the gravity print transport path into two overall sections: a receiving section preceding the rollers and a transporting section following the rollers. The transporting section of the path includes a gravitationally induced freesliding distance D defined between the nip of the rollers 48 and 50 and the exit pin 66 (FIG. 3). Given an original of a particular length, the existence of a gravitational freesliding distance has the advantage of providing a known acceleration such that the original strikes the pin with a substantially predetermined velocity and force dependent only upon its mass. Variations in the force and direction of operator placement of the original are therefore isolated from the gravity-guided transport of the original and have insubstantial effect on its alignment. Although provided by rollers 48 and 50 in this embodiment, the feature of predetermining the gravitational forces acting on the original can be provided by the entrance pin 40 if the length determination provided by the metering roller, and the rollers themselves, were eliminated. If the distance D and the transporting section of the path are determined from the entrance pin 40, the original may be released for gravitationally induced transport dependent upon the presence of the original in the loading section 30 as sensed by the photocell 38.

Figure 5:
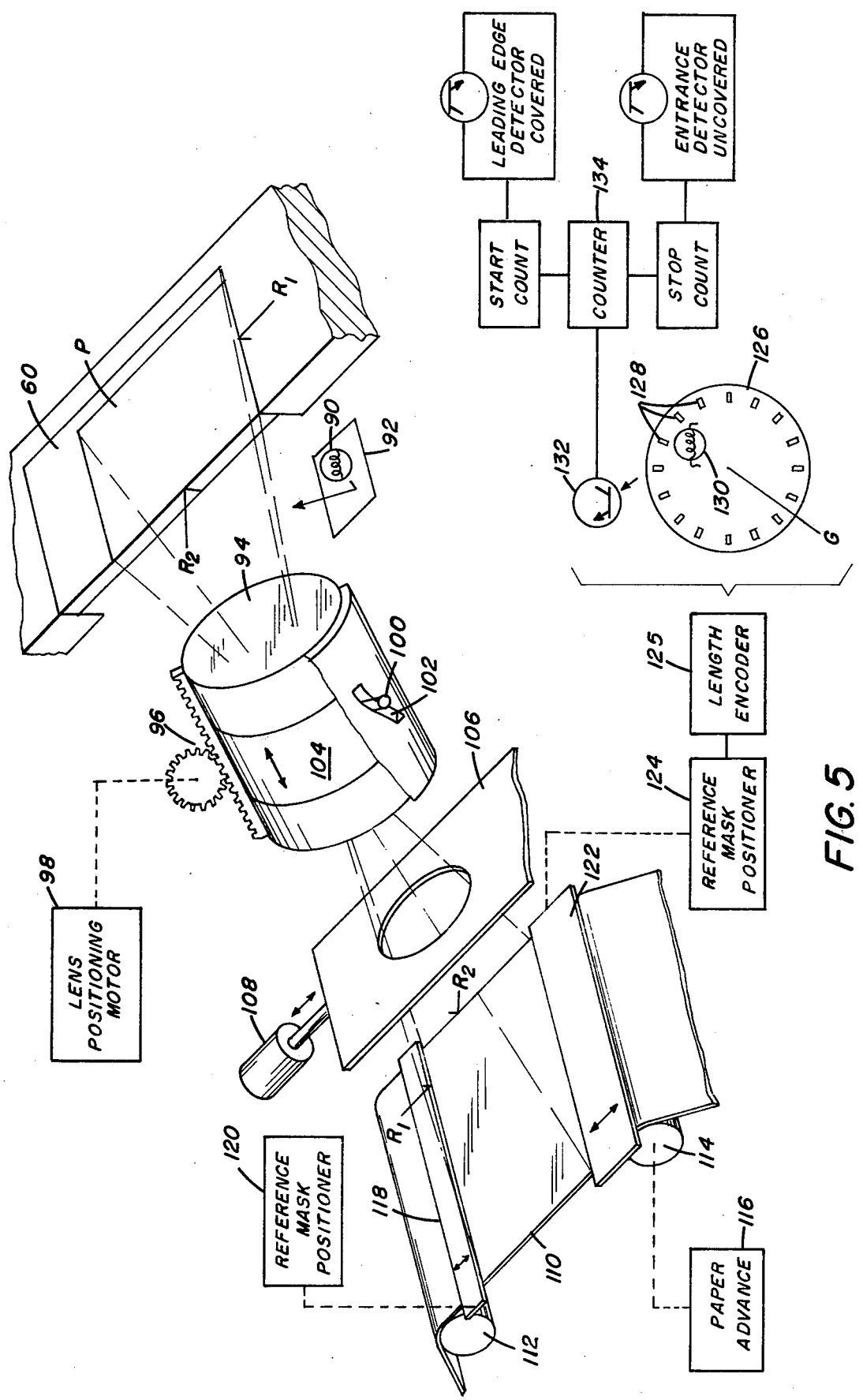

Referring now to FIG. 5, apparatus is illustrated for cooperation with the gravity print transport 20, particularly for exposing light sensitive paper to a photographic print. A portion of the exposure section 34 is reproduced to show a print P lying atop the glass platen 60. A lamp 90 is located nearby the print P and, when energized, emits light that reflects off one or more mirrors 92 and against the platen 60 to illuminate the print P. The lamp 90 is sufficiently baffled to prevent stray illumination from reaching the light sensitive portion of the printer. A compound lens 94 is provided for axial movement by a rack and pinion drive 96 connected to a lens positioning motor 98. This axial movement provides variable magnification. Furthermore, to provide a zoom effect, several elements of the lens 94 are moved axially relative to each other by provision of a cam follower 100 moving with respect to a fixed camming slot 102 when the positioning motor 98 adjusts the axial position of the lens 94. The follower 100 is mounted on a slide 104 that controls internal gears for moving individual elements of the compound lens 94.

A movable shutter 106, controlled by an air cylinder 108, and in reciprocating connection therewith, is located between the lens and the image plane. At the image plane there is located a span of photographic, light-sensitive paper 110 stretched between a guide roller 112 and a drive roller 114. An additional mirror (not shown) may be used in the optical path to produce a correct reading image on the image plane. The movement of the paper is regulated by a paper advance 116 which is also coordinated with a printer (not shown) for putting chop marks on the paper web to key a subsequent chopping operation. Two movable masks are illustrated adjacent the span 110 of paper: a first reference mask 118 (controlled by positioner 120) and a second reference mask 122 (controlled by positioner 124). Both masks function to limit the area of exposure on the span 110 of paper.

The apparatus is further intended for handling different length prints. The mask 122 therefore is precisely movable to block out the correspondingly magnified image of the original print P of predetermined length. The process of predetermining the length is achieved by a length encoder 125. The encoding operation includes an encoder disk 126 adapted for rotation and having a plurality of spaced apertures 128 on the circumference edge thereof. A lamp 130 is appropriately located to shine a beam of light through the apertures 128 to a photosensor 132 which is connected to a counter 134 for determining the number of apertures 128 that pass between the lamp 130 and the photosensor 132 during a given period. The appropriate period is chosen by starting and stopping the counter 134 in conjunction with the leading edge detector 58 and the entrance detector 39, respectively.

Figure 4A:
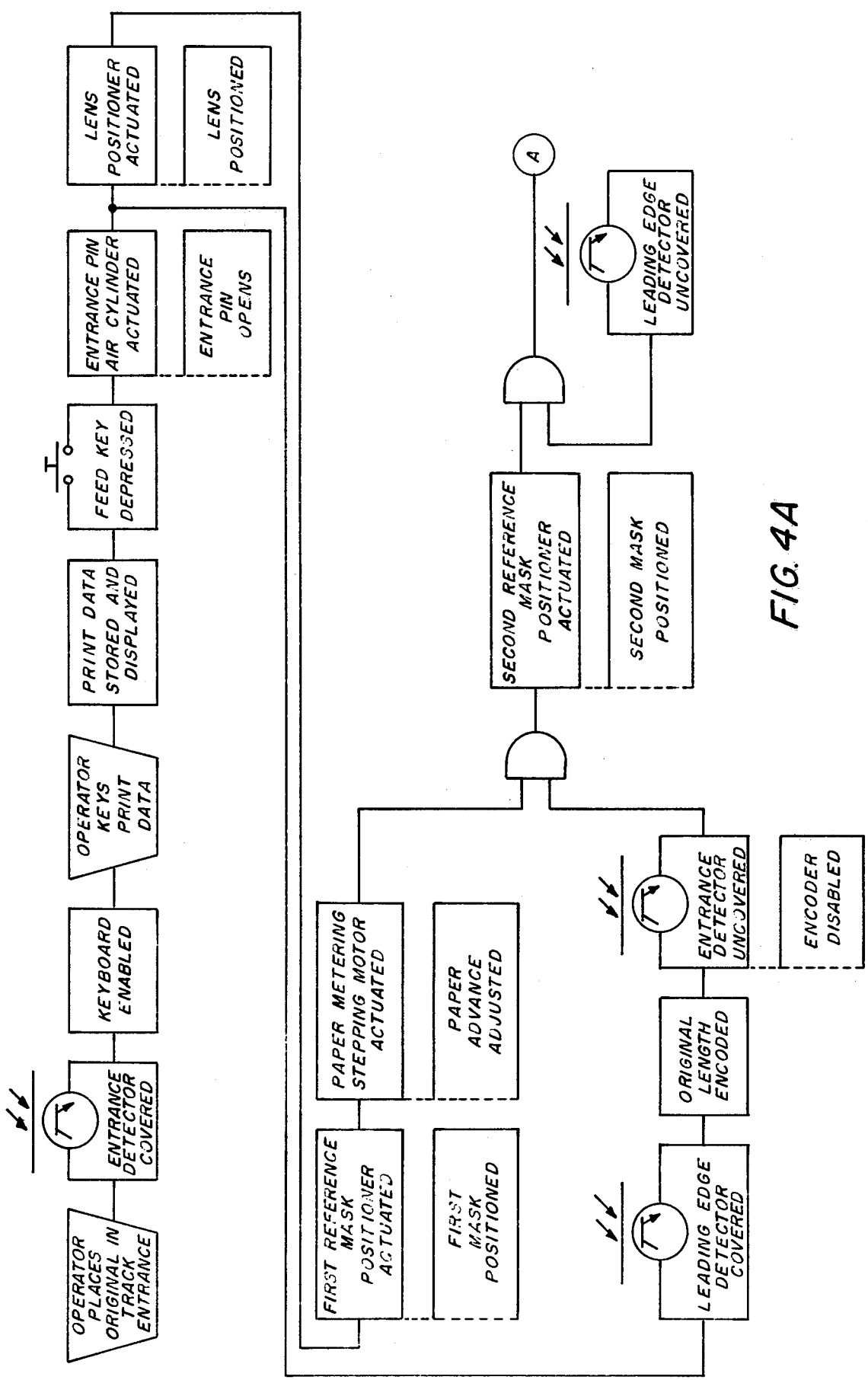

FIGS. 4A and B are program flow diagrams useful in describing the gravity print transport 20 in operation, particularly with other components of the printer 10. In practice, the operational steps of the printer will be under the logic control of a computing facility, such as that provided by a microprocessor. Since the flow diagrams of FIGS. 4A and B stand alone as a description of the operation, only the salient points will be highlighted. Referring to the structure of FIG. 1 in conjunction with the flow diagram, the sequence begins when the operator deposits a print in the feed section 30 of the gravity print transport 20. Due to the orientation of the transport 20 with respect to the horizontal marker 88 (FIGS. 2 and 3), the print—due to gravitational force—engages the guide bed surface 24 and the edge guide surface 26. The high polish on these surfaces minimizes frictional drag and enhances trouble-free slippage over their surfaces. Furthermore the orientation of the transport 20 is such that the print may be deposited vertically at any angle by the operator and gravity will induce the rest of the guidance.

After receiving the print, the surfaces 24 and 26 guide the print to a position up against the entrance pin 40 and covering the entrance detector 39. The consequent break in the light beam triggers internal logic that enables the keyboard 14, in particular the feed key 16. By depressing the feed key 16, the operator signals that a print is ready for copying. If the machine is prepared to process the print through the transport 20, the entrance pin 40 is withdrawn into the aperture 44 so that the print may pass thereover under the influence of gravity. Then the print proceeds into the nip between the metering drive roller 48 and the pinch roller 50. As the leading edge of the print leaves the nip, the leading edge detector 58 is covered and the length encoding sequence is initiated.

Diagrammatically shown in FIG. 5, the length encoding operation consists of counting the number of apertures 128 that pass a given position during a given time. The count is begun—by enabling the counter 134—when the light beam striking the leading edge detector 58 is broken by the leading edge of the print. Each passage of light between the lamp 130 and the photosensor 132 represents one count. The total number of counts is accumulated and interpreted by the length encoder 125 for adjusting the reference mask 122 accordingly and permitting the full length of the image to fall on the paper 110. The encoding sequence is stopped when the entrance detector 39 is uncovered as the trailing edge of the print moves by and completes the light beam. Since the entrance detector 39 is a known distance from the leading edge detector 58, this distance is factored into the length determination.

While the length is being encoded, several operations occur dependent upon the information put into the machine through the keyboard 14. The lens positioner 98 (FIG. 5) adjusts the axial position of the entire lens assembly 94 to correspond to the particular format punched in by the operator. As the lens moves axially the follower 100 slides through the cam slot 102 and forces an axial adjustment in the zoom ring 104. This movement adjusts the position of one or more lens elements within the assembly 94 with respect to each other, making the lens 94 perform substantially as a zoom lens.

At about the same time, the leading edge detector 58 is uncovered as the trailing edge of the print slides by and completes the light beam. The entrance pin 40 is then allowed to close. The print continues momentarily along the transport until it encounters the exit pin 66. At this point the print is stopped and it is positioned abutting the edge guide surface 26. Importantly, the dual incline of the gravity print transport 20 causes the print to stop against the exit pin 66 in a precisely repeatable position with its edge, along the full length thereof, biased against the edge guide 26. What results is a precisely repositionable print plane sufficiently defined by two linear reference positions, denoted by the markers $R_1$ and $R_2$ in FIG. 5.

Since varying aspect ratios and magnifications must be accommodated by the exposure apparatus, it is possible to transfer only one linear reference position, that is $R_2$, to the same edge of the paper time and again. The other reference position $R_1$ is calculated by reference mask logic 120 and set by the variable reference mask 118. Since the logic knows where the linear reference positions always are in the print section 34—due to the guidance features of the transport—and also knows the aspect ratio and magnification from instructions entered by the operator, the first reference mask 118 may be positioned before the print enters the printing section 34. Furthermore, from the same information, the paper advance 116 is adjusted and the lens 94 is positioned. Finally the second reference mask 122 is positioned based on data from the length encoder 125 and the degree of magnification provided by the lens 94.

Once the print is in the exposure position, the print gate detector 74 is covered by the print and the light beam thereto is broken. This signals the air cylinder 64 to drive the clamping pad 62 in close proximity to the glass platen 60 with the print therebetween. The depth of field in the optical system does not require the print to be pressed flat against the glass. With the print substantially clamped against the glass platen 60, the object to be reproduced is assuredly in the exposure plane. Then, in proper sequence, the shutter 106 opens, the lamp 90 energizes, exposure is made onto the paper 110 and the shutter 106 closes. The air cylinder 64 deenergizes and the pad 62 releases from the platen 60, freeing the print. The exit pin 66 then retracts into the aperture 68 and permits the print to pass thereunder until it leaves the guide bed 24 and drops into the collection tray 76. The print gate detector 74 is uncovered as the light beam again strikes it, causing the exit pin 66 to close and the apparatus is ready for the next print.

The original material may have borders or it may be borderless. The exposed image on the span 110 of photosensitive paper is typically borderless. For a borderless original the process of copying may be substantially as described and illustrated in connection with FIG. 5. In the case of bordered originals, the operator enters an appropriate border code through the keyboard 14 when prints of a given border are being run through the machine. The logic of the printer is responsive to this entry and the lens positioning motor 98 correspondingly adjusts the magnification of the lens 94 to bring the edge of the print to the edge of the paper—yielding a borderless exposure. In addition, the mask positioners 120 and 124 correspondingly adjust for the bordered print.

It is to be noted that each of the reference mask positioners 120 and 124 are controlled by the size of the borders (if any) on the original and also by the desired amount of image spillover. The image is said to spill over when it is slightly larger than the corresponding paper area. Spillover is advantageous when there are unavoidable variations in the mechanical and optical system which cause the position of the image to shift slightly from print to print. In addition, the length encoder 125 and the magnification of lens 94 also control the reference mask positioner 124. Further, the position of reference mask 118 figures into the position of reference mask 122.

Figure 4B:
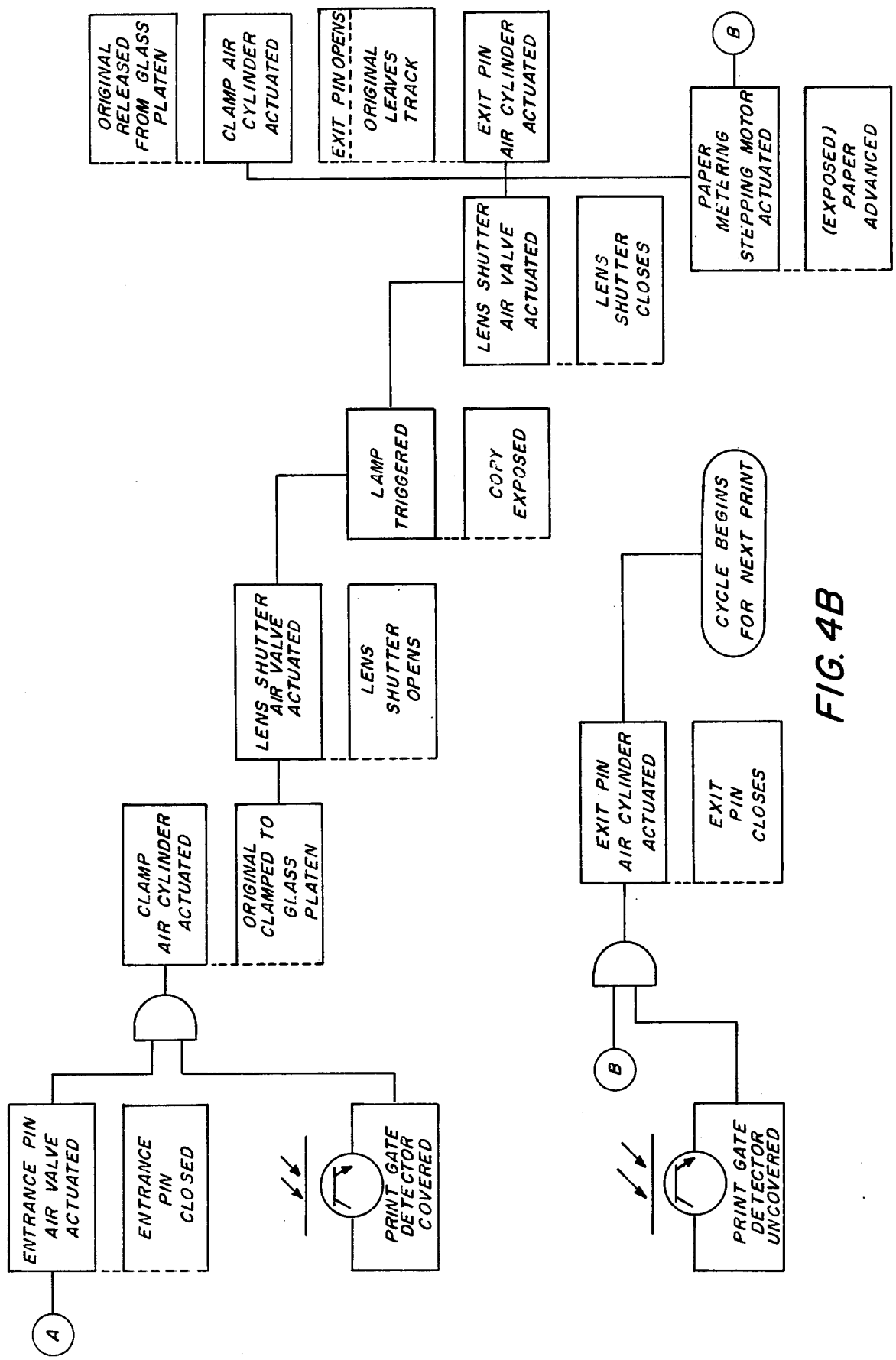

It is to be understood that the logic and flow diagrams of FIGS. 4A and 4B are simplified to show salient logic features only. Other functions are understood. For example, cross checks and interlocks are usual in such logic to insure that one print is completely processed before another is permitted to advance beyond the entrance pin 40. Also, facility may be provided for cycling through exposures of a print several times if multiple copies are desired, identifying a customer order and associating the copies therewith, etc. Suitable discharging apparatus for directing air along the guiding sufaces of the gravity transport is helpful in controlling dust. Furthermore, by ionizing the air discharge in conventional ionizing apparatus static build-up is controlled.

The original material transported under influence of gravity has been described, by way of preferred example, as a photographic print. Though such an original is typically a non-transparent positive, transparencies or negatives may also be handled in this manner. Since the apparatus is useful generally with a copier, the original may also be any material possessing sufficient stiffness to adapt to the guidance offered by the polished guiding surfaces and gravity.

The invention has been described in detail with particular reference to a presently preferred embodiment thereof, but it will be understood that variations and modifications can be effected within the spirit and scope of the invention. For example, although the apparatus has been described for use with a photographic printer, it is understood that the concept is equally applicable to any transport for feeding sheet material through one or more operative stations each requiring precise alignment of the sheet therewith. Such additional use may be found in the electrophotographic copying art, for example. For this reason the material being copied may be generically referred to as an original, or an element bearing indicia, rather than a photographic print.

What is claimed is:

1. Apparatus for supporting and guiding a sheet-like, information-bearing original having a face and an edge to a predetermined position in a copier exposure station for exposing light-sensitive material to the original, said apparatus comprising:

means for supporting the original and for guiding movement of the original through the copier to the predetermined position, said supporting means including guiding surfaces inclined with respect to horizontal whereby the face and edge are directed into contact with said guiding surfaces respectively under the influence of gravity to thereby induce guided gravitational movement of the original to the predetermined position;

means disposed adjacent the exposure station for engagement by the original to interrupt movement of the original at the predetermined position;

means for detecting the presence of the original at the predetermined position; and means responsive to detection of the original by said detecting means for exposing the light-sensitive material to the original.

2. Apparatus for supporting and guiding sheet-like, information-bearing originals, each having a face and an edge, to a predetermined position in a copier exposure station for exposing light-sensitive material to an original and providing a likeness thereof, said apparatus comprising:

means for supporting each original and for guiding movement of the original through the copier to the predetermined position, said means including first and second guiding surfaces inclined with respect to horizontal whereby first and second components of gravitational force on the original direct the face and edge respectively into contact with said first and second guiding surfaces and a third component of gravitational force induces the original to slide toward said predetermined position in contact with said guiding surfaces, the components of gravitational force on the original inducing the face and edge thereof of successive originals into like sliding contact with said guiding surfaces;

registration means disposed adjacent the exposure station for engagement by the original to interrupt movement of the original at the predetermined position;

means for detecting the presence of the original at the predetermined position; and means responsive to detection of the original by said detecting means for exposing the light-sensitive material to the original.

3. Apparatus as claimed in claim 2 wherein said means for exposing comprises a transparent platen and means for clamping the original in close proximity to the platen at said predetermined position.

4. Apparatus for supporting and guiding sheet-like, information-bearing originals, each having a face and an edge, along a path having a first elongate original receiving section terminating at a first original restraining location and a second subsequent elongate original transporting section extending to a second original exposure location in a copier exposure station for exposing light sensitive material to an original, the original being initially received along the first section, said apparatus comprising:

means for supporting each original and for guiding movement of the original along the path through the copier, said means including first and second guiding surfaces inclined with respect to horizontal whereby first and second components of gravitational force on the original direct the face and edge respectively into contact with said first and second guiding surfaces and a third component of gravitational force induces the original to slide along said path in contact with said guiding surfaces, the components of gravitational force on the original inducing the face and edge thereof of successive originals into like sliding contact with said guiding surfaces;

actuatable means positioned proximate the first location for releasably restraining the original at said first location;

means for actuating said restraining means to release the original to permit gravitational force to induce sliding movement of the original along the length of the second section to the second location;

registration means disposed adjacent the exposure station for engagement by the original to interrupt movement of the original at the second location;

means for detecting the presence of the original at the second location; and means responsive to the detection of the original by said detecting means for exposing the light-sensitive material to the original.

5. Apparatus as claimed in claim 4 further including means for sensing the presence of the original at the first location, said actuating means including means responsive to the sensing of the original by said sensing means for releasing the original whereby gravitational force induces the original to slide along the length of the second section.

6. Printer transport apparatus for guiding an original having a face, a side edge and a leading edge along a path from a loading station to an operative station in a photographic printer and there aligning the original in a reference position; said apparatus comprising:

means defining first and second elongate surfaces extending from the loading station to the operative station for guiding the original therebetween, said first and second surfaces being inclined at respective angles, that are acute with respect to horizontal, to cause the original to slide, under the influence of gravity and with the face and side edge in engagement with said surfaces, from the loading station to the operative station; and means proximate the operative station engageable with the leading edge for intercepting and stopping the moving original with the original aligned in the reference position and engaged with the first and second surfaces and the intercepting means under the influence of gravity.

7. Printer transport apparatus for guiding an original having a face, a side edge and a leading edge along a path having a loading section, where the original is initially placed on the path, to an operative station and there aligning the original in a reference position; said apparatus comprising:

means defining first and second elongate surfaces extending along the path from the loading section to the operative station for guiding the original therebetween, said first and second surfaces being inclined at respective angles, that are acute with respect to horizontal, to cause the original to slide, under the influence of gravity and with the face and side edges in engagement with said surfaces, through the path from the loading section to the operative station;

actuatable means for stopping movement and releasably restraining the original upon initial gravitational movement of the original to a first position in the loading section;

means for actuating said releasable restraining means to release the original for sliding movement under the influence of gravity to the operative station; and means at the operative station for engagement by the leading edge for intercepting and stopping the sliding original with the original aligned in the reference position in engagement with the first and second surfaces and the intercepting means under the influence of gravity.

8. In photographic printing apparatus for exposing light-sensitive paper to original photographic sheet material having a face and an edge, and making duplicate copies thereof; the printing apparatus including transport means for accepting the original material at a feed section and transporting it to an exposure section, the improvement wherein the transport means comprises:

delivery means including a first guide surface inclined with respect to horizontal for engagement by the face of the original material, and a second guide surface acutely inclined with respect to horizontal and intersecting said first guide surface, for engagement by the edge of the original material, the inclination of said guide surfaces being such that the original material moves in a predetermined path from the feed section to the exposure section in sliding contact with said guide surfaces under the influence of gravitational forces; and means located proximate said exposure section for interrupting the movement of the original material and orienting the original material in engagement with said first and second surfaces in a predetermined position relative to the exposure section.

9. In a transport apparatus for use with a copy machine including means for guiding an original sheet having a face and edge along a predetermined path to an exposure position in the machine, the improvement wherein the guiding means comprises:

means having a first planar surface for supporting and guiding the face of the original sheet during movement of the sheet to the exposure position;

means having a second planar surface for supporting and guiding the edge of the original sheet during movement of the sheet to the exposure position;

means for supporting said edge guiding means and said face guiding means with said first and second planar surfaces substantially at right angles to each other, said surfaces being inclined relative to horizontal to form a sheet guide which induces gravitational movement of the sheet along the predetermined path; and reference means adjacent the exposure position for engagement by the original sheet to stop the original sheet in the exposure position.

* * * * *